Jan. 14, 1947.  W. D. W. RICHMAN  2,414,273
MOVABLY MOUNTED AND VIBRATORY DEVICE FOR
FEEDING GREASY OR VISCOUS MATERIAL
Filed Jan. 9, 1943   3 Sheets-Sheet 1
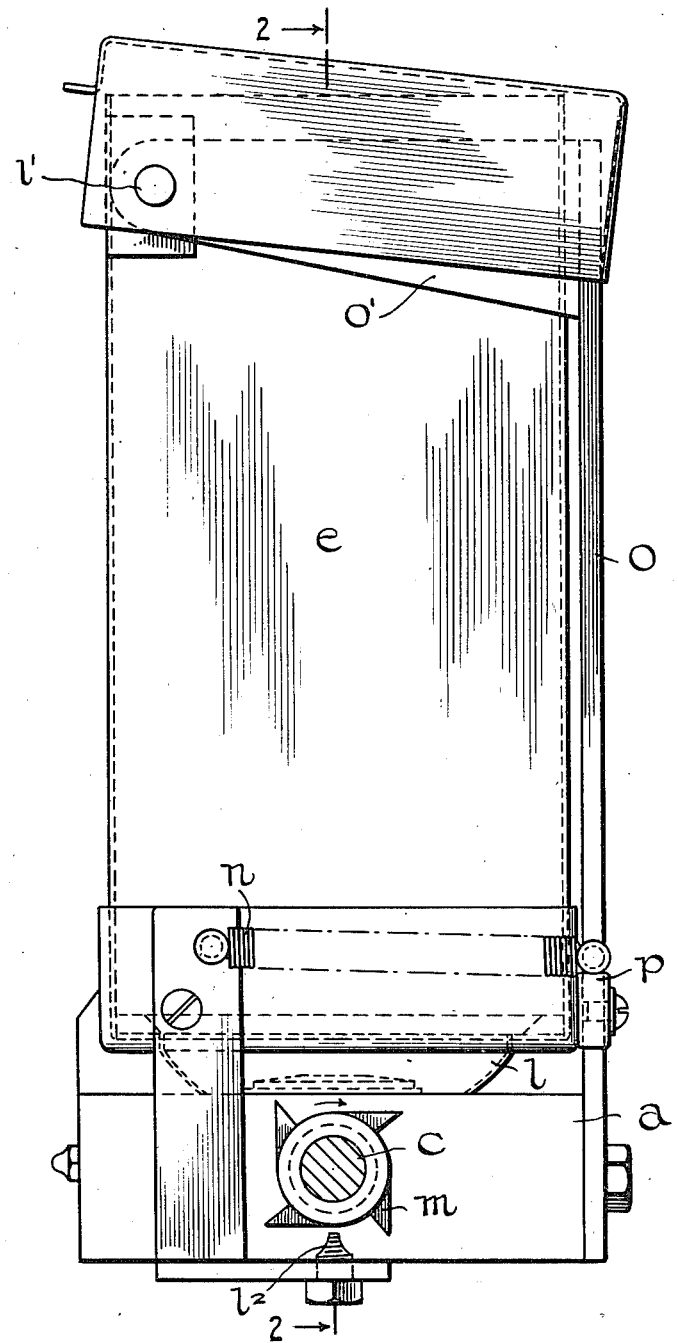
FIG. I.
INVENTOR
WILLIAM DOUGLAS WISE RICHMAN
BY
ATTORNEY Jan. 14, 1947.                W. D. W. RICHMAN                    2,414,273
            MOVABLY MOUNTED AND VIBRATORY DEVICE FOR
                  FEEDING GREASY OR VISCOUS MATERIAL
                        Filed Jan. 9, 1943              3 Sheets-Sheet 2
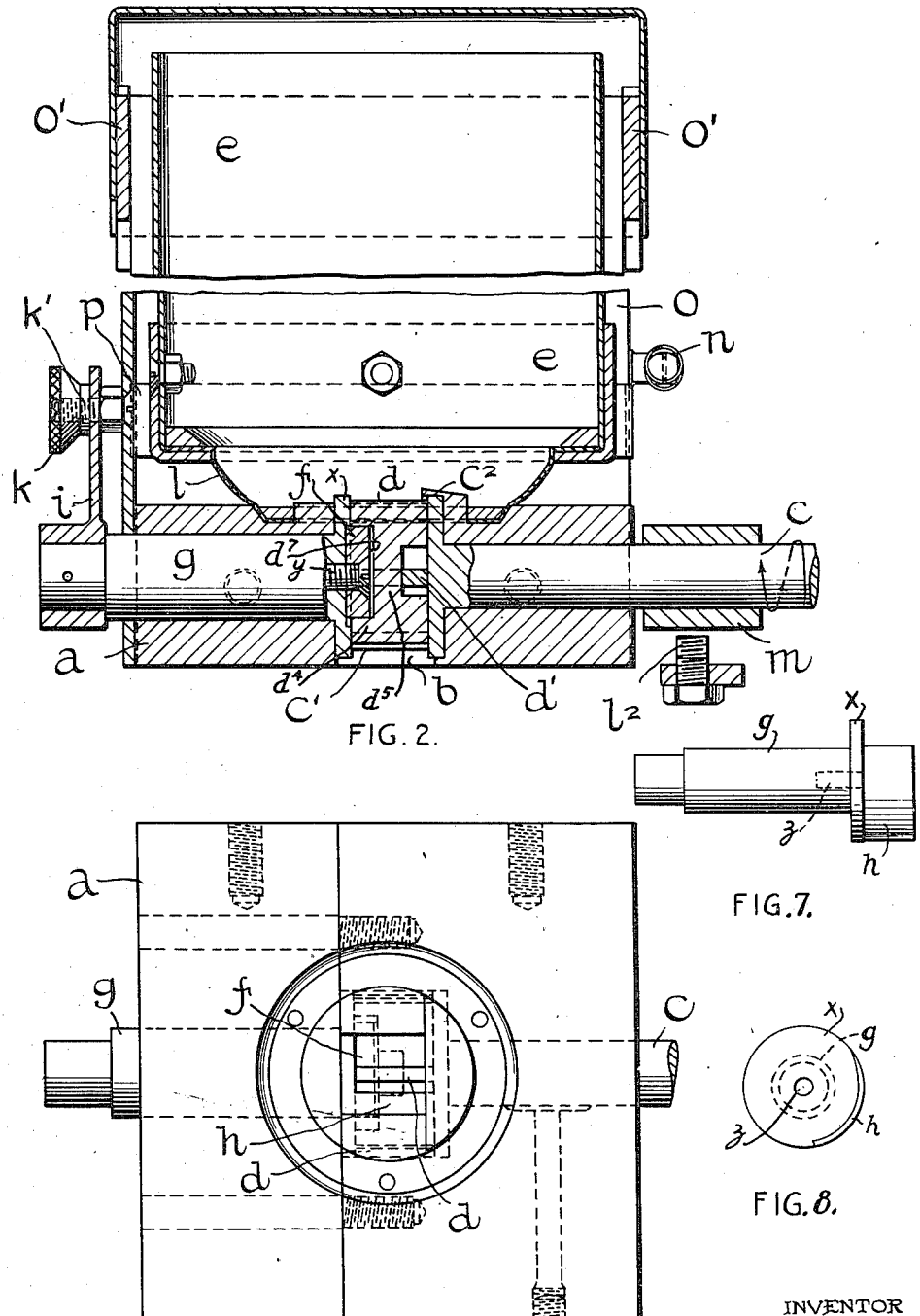
INVENTOR
WILLIAM DOUGLAS WISE RICHMAN
BY A. M. Houghton
ATTORNEY Jan. 14, 1947.   W. D. W. RICHMAN   2,414,273
MOVABLY MOUNTED AND VIBRATORY DEVICE FOR
FEEDING GREASY OR VISCOUS MATERIAL
Filed Jan. 9, 1943   3 Sheets-Sheet 3

INVENTOR
WILLIAM DOUGLAS WISE RICHMAN
BY
ATTORNEY

UNITED STATES PATENT OFFICE 2,414,273

MOVABLY MOUNTED AND VIBRATORY DEVICE FOR FEEDING GREASY OR VISCOUS MATERIAL

William Douglas Wise Richman, Trowbridge, England

Application January 9, 1943, Serial No. 471,913
In Great Britain March 17, 1942

4 Claims. (Cl. 222—161)

This invention relates to the feeding of greasy powders or viscous liquids and has for its object to devise simple and effective apparatus by which the feed may be carried out uniformly and with certainty.

The invention is primarily concerned with the feeding of uniform and small quantities of greasy powder such, for example, as the insecticides or fungicides which are now largely employed for mixing with seed grain but it is applicable with equal advantage to the feeding of other greasy, moist or tacky powders and also to the feeding of viscous liquids such as molasses.

The invention consists in a feeding device for the purposes referred to comprising a feed passage to which the material is supplied, and a movable member in said passage having a feed or scraper blade or blades with means for automatically protruding and retracting such blade or blades so that a blade will be protruded to abstract from the bulk of the material a small quantity which is then carried by the blade through the feed passage and delivered from the latter as the blade is retracted, and a shroud adjustable angularly in the feed opening in order to vary the area of said opening for the purpose of varying the rate of feed.

The invention also consists in a feeding device according to the preceding paragraph having a storage receptacle or hopper for the bulk material and means by which the hopper may be periodically agitated for the purpose of shaking the material therein and causing the same to settle in the path of the blade or blades.

Further features of the invention will be apparent from the description given hereafter.

The accompanying drawings illustrate one convenient form of apparatus in accordance with the invention.

Figure 1 is an outside elevation of the apparatus.

Figure 2 is a section on the line 2—2 of Figure 1, with a part broken away.

Figure 3 is a plan of the base of the apparatus with the hopper removed.

Figure 7 is a detailed side elevational view of the rotatable adjustable shaft and the shroud, and Figure 8 is a right hand end view of Figure 7.

Figure 4:
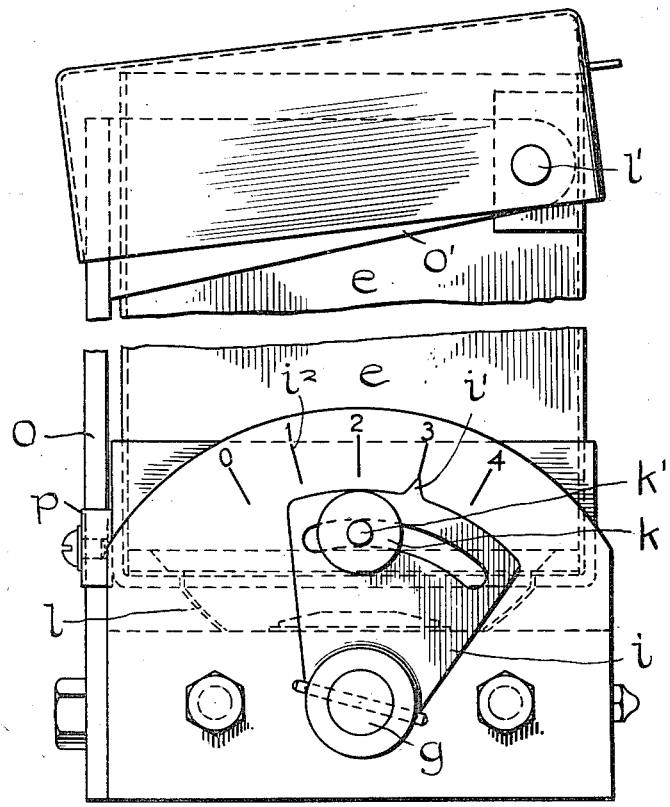
Figure 4 is a side view of the apparatus shown in Figure 1, a part being broken away.
Figure 5:
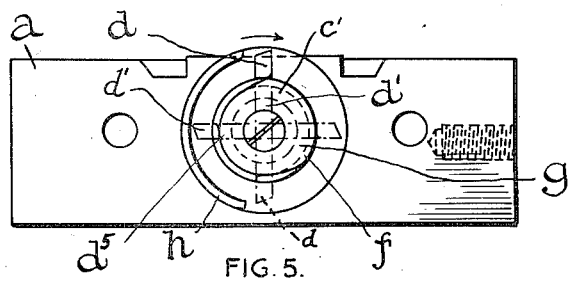
Figures 5 and 6 are two face views taken at the line of division of the base shown in Figure 3, the two views being taken in opposite directions.
Figure 6:
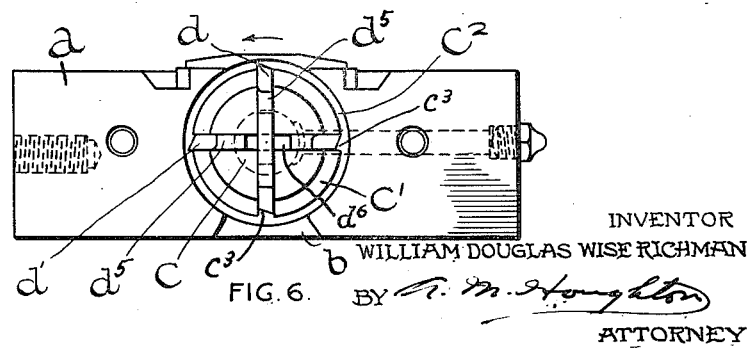

In carrying my invention into effect in one convenient manner when, for example, producing an apparatus suitable for the feeding of greasy powders I form my improved apparatus with a base $a$ of suitable construction having a feed passage $b$ therethrough from the upper to the lower surface. Rotatably mounted in the base is a driving shaft $c$ having a barrel-like or cylindrical hollow portion $c^1$ mounted in the feed passage so as substantially to fill the latter with the exception of an annular space $c^2$ (Figure 6) into which may be protruded one or more blades $d$ carried by said barrel-like portion for the purpose of abstracting from a hopper or storage vessel $e$ arranged upon the base a film, as it were, of the material to be fed and carrying the same round the annular space to be delivered at the outlet opening when the blade is retracted into the cylindrical member.

In the construction shown a pair of interfitting movable blades $d$ and $d'$ (Fig. 6) are disposed substantially at right angles to each other within the barrel $c'$ and are slidably mounted in diametrically disposed or radial slots $c^3$ arranged circumferentially of the barrel $c'$. The body $d^4$ of the blade $d$ is preferably of the shape shown in Fig. 2 in cross section and is formed so as to be movable in one of the slots $c^3$ so that the blade $d$ at opposite ends thereof may be protruded and retracted relative to the barrel $c'$. The body $d^4$ of the blade $d$ has a centrally disposed reduced portion $d^5$ while the body of the blade $d'$ has an intermediate elongated opening $d^6$ through which the reduced portion $d^5$ of the body $d^4$ extends so that the blades $d$ and $d'$ may be moved longitudinally in their respective slots $c^3$ a limited distance relative to each other. A cam $f$ carried by the inner end of a rotatable adjustable shaft $g$ extends into the barrel $c'$ so as to fit within the recess $d^7$ in each of the rotatable blades. The cam $f$ engages the inner top and bottom walls of the recess $d^7$ so that upon rotation of the shaft $c$, the blades $d$ and $d'$ will be protruded and retracted by reason of the engagement of the cam $f$ with the adjacent walls of the blades. The cam $f$ is so shaped and positioned that as each blade passes the upper portion of the feed passage $b$, the blade will be moved outwardly by contact with the cam $f$ to remove from the bulk of the material a small quantity thereof, which is then carried by the blade through the feed passage and discharged therefrom. The inner end of the rotatable adjustable shaft $g$ carries thereon a curved or segmental shroud or member $h$. As shown, this shroud extends outwardly from a cylindrical flange $x$ (Figure 7) on the inner end of the shaft $g$. The cam $f$ (Figure 2) is centrally connected to the flange $x$ by the threaded pin $y$ which extends through an axial opening $z$ in the shaft $g$. The curved shroud or valve $h$ is spaced from the cam $f$ and extends into and across the feed passage $b$ as clearly shown in Figure 3. Thus, it will be seen that the shroud $h$ through the adjustment of the shaft $g$ may be adjusted angularly in the feed passage $b$ in order to vary the area of said passage for the purpose of controlling the rate of feed. If desired the said shroud may be associated with an external scale and pointer which will indicate the extent of adjustment of the shroud and the whole may be secured in any adjusted position by means of a screw and mill-headed nut or otherwise. For example, in the arrangement shown, the stationary shaft $g$ carries a slotted quadrant $i$ by which the shaft is adjusted to adjust the shroud, the quadrant carrying a pointer $i^1$ associated with the scale $i^2$ and being held in adjusted position by the nut $k$ engaging a stud $k^1$ on a bracket on the base.

The hopper or storage vessel $e$ is preferably provided at its lower part with a rubber, thin sheet metal, or other flexible diaphragm $l$ rigidly held upon the base and having an aperture therein through which material may pass to the feed opening and in order to make the apparatus more efficient the hopper is pivoted at its upper end as at $l^1$ and carries at its lower part a projection $l^2$ adapted to be acted upon by a cam $m$ carried upon the rotary shaft $c$ so that during rotation of the latter the hopper is moved against the action of a spring $n$ and at the end of a rotation or a plurality of times during a rotation is suddenly released by the cam so that the hopper will be strongly shaken or vibrated in order to shake the material therein and cause the same to settle at the feed opening so that there will be no danger of the material sticking in the hopper and the feed consequently ceasing. In the particular arrangement shown there is a plate $o$ secured to one side of the base and formed with or carrying two arms $o^1$ to which the upper edge of the hopper remote from the plate $o$ is pivoted, and a tension spring $n$ is anchored to the plate and to a projection on the hopper. Due to the arcuate movement imparted to the hopper by the cam, the mass of material in the hopper will be moved in a downward direction and thus certainty of feed will be ensured. It will be observed from the relationship between the cams $f$ and $m$ that in the arrangement illustrated the hopper is agitated immediately before a blade is protruded into the feed passage so that a supply of material is always available in the feed passage just before the blade protrudes thereinto. In other words, the cam $f$ and cam $m$ are so positioned relative to each other and the rotation of the shaft $c$ is so synchronized as to insure the agitation of the hopper $e$ immediately before a blade is protruded into the feed passage.

If desired I may provide a rubber or other buffer $p$ on the plate or hopper to prevent excessive wear due to direct impact of one part on the other under the influence of the spring.

When using the device to feed insecticidal or fungicidal powders to seed grain, for example, before the latter is bagged, the device may be mounted over a conveyor belt by which the seed grain is conveyed to the sacking point and by means of the invention it will be seen that a small and uniform proportion of the powder will be mixed with the grain.

The invention is not to be limited to the foregoing details of construction which are given by way of illustration only as the number, disposition, and mode of operation of the blades may be varied to suit any particular requirements.

I claim:

1. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a hollow cylindrical member positioned in said passage, spaced blades movably mounted in said cylindrical member, and a relatively fixed shaft mounted for rotatable adjustment in the other of said openings and having a cam extending into said passage and arranged to engage said blades for protruding and retracting the same at predetermined intervals during the rotation of said hollow member, said relatively fixed shaft having a flanged inner end provided with a shroud extending into said passage for controlling the flow of the material therethrough.

2. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a hollow member positioned in said passage, spaced blades movably mounted in said hollow member, a relatively fixed shaft mounted for rotatable adjustment in the other of said openings and having a cam extending into said passage and arranged to engage said blades for protruding and retracting the same at predetermined intervals during the rotation of said hollow member, said relatively fixed shaft having a shroud on its inner end spaced from said cam and extending into said passage for controlling the flow of the material therethrough, and means upon rotatable adjustment of the stationary shaft for maintaining the same in an adjustable fixed position to adjust the cam and shroud in order to regulate flow of the material through said passage.

3. A feed device of the class described having in combination, a base, a hopper mounted on the base, said base having a vertical feed passage communicating with the hopper and transversely disposed openings communicating with the feed passage on opposite sides thereof, a rotatable shaft extending into one of said openings and having a hollow member positioned in said passage, spaced blades movably mounted in said hollow member, a relatively fixed shaft mounted for rotatable adjustment in the other of said openings and having a cam extending into said passage and arranged to engage said blades for protruding and retracting the same at predetermined intervals during the rotation of said hollow member, said relatively fixed shaft having a curved shroud on its inner end spaced from said cam and extending into feed passage for controlling the flow of the material therethrough, and means upon rotatable adjustment of the relatively fixed shaft for maintaining the same in an adjusted position so as to simultaneously adjust the cam and the shroud relative to the feed passage and the blade.

4. A feed device of the class described having in combination, a base, a hopper pivotally mounted on the base, said base having a vertical feed passage communicating with the hopper and transversely disposed openings communicating with the feed passage on opposite sides thereof, a rotatable shaft extending into one of said openings and having a hollow cylindrical member positioned in said passage, spaced blades movably mounted in said cylindrical member, a relatively fixed shaft mounted for rotatable adjustment in the other of said openings and having a cam extending into said passage and arranged to engage said blades for protruding and retracting the same at predetermined intervals during the rotation of said hollow member, said blades arranged to be protruded as they pass the hopper, and means on said rotary shaft operatively connected to said hopper for agitating the same at predetermined intervals during rotation of said last mentioned shaft, the parts being constructed and arranged so that the hopper is agitated immediately before the blades are protruded.

WILLIAM DOUGLAS WISE RICHMAN.